United States Patent Office 3,414,589
Patented Dec. 3, 1968

3,414,589
1'-CYCLOBUTENO-(3',4';16α,17α) DERIVATIVES
OF THE PREGNANE SERIES
John H. Fried, Palo Alto, Calif., assignor to Syntex
Corporation, Panama, Panama, a corporation of
Panama
No Drawing. Filed July 11, 1966, Ser. No. 568,062
19 Claims. (Cl. 260—397.1)

ABSTRACT OF THE DISCLOSURE

Novel 1'-cyclobuteno-(3',4';16α,17α) derivatives of the pregnane series having progestational activity.

---

This invention relates to novel steroids and to a method for the preparation thereof. More particularly, this invention relates to steroids of the pregnane series containing a cyclobuteno moiety fused to the C-16 and C-17 carbon atoms of the steroid nucleus. Specifically, this invention relates to novel 1'-cyclobuteno-(3', 4';16α,17α) derivatives of the pregnane series.

The novel portion of the steroidal molecule may be shown by the following partial representation of the D-ring:

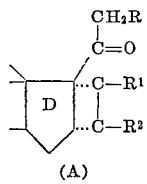

(A)

wherein R is hydrogen, chloro or fluoro; and each of $R^1$ and $R^2$ independently is hydrogen, an electropositive group such as lower alkyl or the like, or an electronegative group such as cyano, halo, carboalkoxy or the like.

By the term lower alkyl is meant a straight or branched chain alkyl group containing from 1 to 4 carbon atoms inclusive. By the term carboalkoxy is meant the group —COOR in which R is lower alkyl as defined hereinabove.

The novel 1'-cyclobuteno moiety is introduced at the C-16 and C-17 position of the steroid nucleus by the photochemical additional of an acetylene of the formula $R^1C\equiv CR^2$, in which each of $R^1$ and $R^2$ independently is hydrogen, carboxy, carboalkoxy, halo, cyano, lower alkyl or halomethyl, to a $\Delta^{16}$-ene of the pregnane series.

In the practice of the process, a $\Delta^{16}$-ene of the pregnane series and an acetylene of the formula $R^1C\equiv CR^2$, wherein $R^1$ and $R^2$ are as defined hereinabove, are irradiated with ultraviolet light of a wave length in the range of about 270 to 330 mu in the presence of an inert organic solvent such as benzene, dioxane and the like, preferably benzene. Under these conditions, the acetylene adds across the double bond with the orientation of the cyclobuteno moiety at the C-16 and C-17 carbon atoms being predominantly alpha. In the case of unsymmetrically substituted acetylenes, a mixture of products is routinely obtained which is separated by a conventional technique, e.g. chromatography.

In addition to the cyclobuteno substituent, the novel compounds of the pregnane series may optionally contain other groupings and elaborations known to those skilled in the art of steroid chemistry, for example, a 3-keto-$\Delta^4$-ene group, a 3β-hydroxy-$\Delta^4$-ene as well as a 3β-ether such as tetrahydropyran-2-yl, tetrahydrofuran-2-yl or a 3β-acyloxy group such as acetoxy, propionoxy or the like, may be present. The groupings include a 3-keto-$\Delta^{4,6}$-diene, a 3-keto-$\Delta^{1,4}$-diene, a 3-keto-19-nor-$\Delta^4$-ene, a 3-keto-$\Delta^{1,4,6}$-triene, and a 3-keto-19-nor-$\Delta^{4,6}$-diene.

In addition, a 6α-substituent such as a 6α-fluoro, a 6α-chloro, a 6α-methyl, or a 6α-trifluoromethyl; a $\Delta^6$-ene system either alone or in combination with a 6-fluoro, a 6-chloro, a 6-methyl or a 6-trifluoromethyl substituent is present. Other substituents, for example, include a 1α,2α or 6α,7α-methylene or halomethylene substituent. The halomethylene group is either dichloromethylene or difluoromethylene.

Illustrative of the combinations and elaborations mentioned hereinbefore, are those compounds of the pregnane series represented by the following formula:

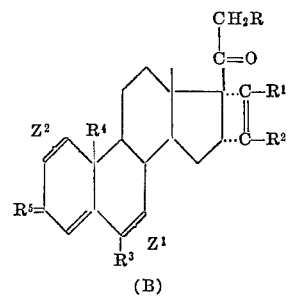

(B)

wherein $Z^1$ is a carbon-carbon single bond, a carbon-carbon double bond or the group

bridging the C-6 and C-7 carbon atoms, X being hydrogen, chloro or fluoro;

$Z^2$ is a carbon-carbon single bond, a carbon-carbon double bond or the group

bridging the C-1 and C-2 carbon atoms, X' being hydrogen, chloro or fluoro;

R is hydrogen, chloro or fluoro;

each of $R^1$ and $R^2$ is hydrogen, carboxy, carboalkoxy, halo, lower alkyl, cyano or halomethyl;

$R^3$ is hydrogen, chloro, fluoro, methyl or trifluoromethyl, $R^3$ being in the β-configuration when $Z^1$ is the group

and $R^3$ being in either the α- or β-configuration when $Z^1$ is a carbon-carbon single bond;

$R^4$ is hydrogen or methyl, $R^4$ being methyl when $Z^2$ is a carbon-carbon double bond; and $R^5$ is keto or the group

wherein $R^6$ is hydrogen, tetrahydropyran-2-yl, tetrahydrofuran-2-yl or a hydrocarbon carboxylic acyl group containing less than 12 carbon atoms.

The hydrocarbon carboxylic acyl group of the present invention will contain less than 12 carbon atoms and may be of a straight, branched, cyclic or cyclic-aliphatic chain structure, may be saturated, unsaturated or aromatic and optionally substituted by groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate and the like.

The novel compounds of the present invention are progestational agents and are useful in fertility control and the management of various menstrual disorders. The compounds also possess hormonal properties characteristic of anti-androgenic, anti-gonadotrophic and anti-estrogenic agents. These compounds may be administered via usual routes in the standard pharmaceutical compositions and at dosages appropriate for the particular condition being treated.

The novel compounds of the present invention are prepared from an intermediate of the following formula:

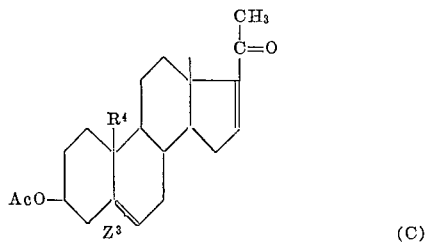

wherein $R^4$ is as defined hereinabove, and $Z^3$ is a carbon-carbon double bond or a carbon-carbon single bond.

The following list is representative of the acetylenes for the photochemical addition reaction.

| Substituted acetylenes with electropositive groups | Substituted acetylenes with electronegative groups |
|---|---|
| Propyne-1 | 3,3,3-trifluoro-propyne-1. Acetylene dicarboxylic acid. |
| Butyne-1 | Propiolic acid. |
| Butyne-2 | Ethyl propiolate. |
| 3-methylbutyne-1 | Ethyl acetylenedicarboxylate. Chloropropiolic acid. Tetrolic acid. |
| Pentyne-1 | Ethynyl bromide. |
| 4,4-dimethylpentyne-1 | Propargyl chloride. |
| 4,4-dimethylpentyne-2 | Propargyl bromide. |
| 4-methylpentyne-2 | Propargyl iodide. Difluoro acetylene. Dibromo acetylene. 1,3-dibromo, propyne. 1-iodopropyne. |
| Hexyne-1 | Ethynyl chloride. |
| Hexyne-2 | Dichloro acetylene. |
| Hexyne-3 | Cyano acetylene. |
| 2-methylhexyne-3 | Dicyano acetylene. Diodo acetylene. |

In the practice of the process, those substituted acetylenes which are gaseous at room temperature, are bubbled through the solvent during the course of the photochemical reaction, whereas those which are either liquids or solids at room temperature are dissolved in the solvent prior to the photochemical reaction. This reaction may be represented as follows:

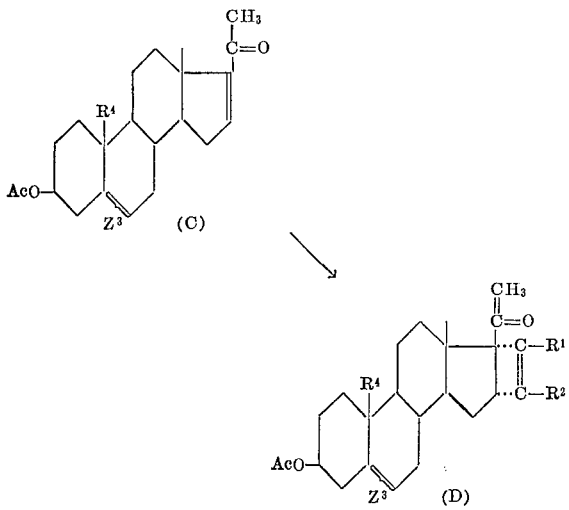

Further elaboration of the product of the principal reaction may be represented by the following general reaction scheme. In the practice of the process, the unsaturated linkage in the cyclobuteno moiety is protected during the course of the subsequent reactions by formation of a 1',2'-oxidocyclobutano group in those cases where the double bond would be impaired. The cyclobuteno group is subsequently regenerated by treatment of the oxido compound with sodium iodide and zinc dust in acetic acid, i.e. by a conventional Cornforth reaction. A 21-chloro or fluoro substituent is introduced, preferably at this stage, but alternatively at a later stage, by treatment with metallic copper and iodine in tetrahydrofuran to give a 21-iodo intermediate, and treatment of the intermediate with a molar equivalent of lithium chloride in dimethylformamide or a molar equivalent of silver fluoride in acetonitrile to afford the 21-chloro or 21-fluoro compounds of the present invention, respectively.

In those instances in which $Z^2$ is a methylene or dihalomethylene substituent bridging the $1\alpha,2\alpha$-positions, the compounds of Formula (C), wherein $Z^3$ is a carbon-carbon single bond and the configuration of the hydrogen atom in the 5-position is $\alpha$, are hydrolyzed as with potassium bicarbonate in methanol to yield the corresponding 3-hydroxy derivative, which is converted to the corresponding 3-keto compound through treatment with chromium trioxide in pyridine. Bromination of this keto compound as with bromine in acetic acid, followed by dehydrobromination of the resulting 2-bromo intermediate as with calcium carbonate, next yields the 1',2'-oxidocyclobutano-(3',4';16α,17α)-5α-pregn-1-ene-3,20-dione. This $\Delta^1$ compound is then allowed to react with an alkali or alkaline earth metal salt of an acid having a formula WCXYCOOH in which W is chloro or iodo and each of X and Y is hydrogen, fluoro or chloro, at least one of X and Y being other than hydrogen. When a $1\alpha,2\alpha$-methylene substituent is desired, this group is introduced through the action of dimethylsulfoxonium methylide in dimethylsulfoxide, preferably after reducing the keto groups in the 3 and 20-position with sodium borohydride and back-oxidizing the 3-hydroxy group with manganese dioxide or 2,3-dichloro-5,6-dicyanobenzoquinone. The 20-keto group may be regenerated after introduction of the $1\alpha,2\alpha$-methylene group by simple oxidation with chromic trioxide in pyridine. Bromination of the resultant $1\alpha,2\alpha$-methylene-3-keto compound and dehydrobromination as described above yields the corresponding 3-keto-$\Delta^4$ derivative.

The compounds of Formula (C) wherein $Z^3$ is a double bond, may be converted to the 3-keto-$\Delta^4$ derivatives directly through hydrolysis as described above to yield the 3-hydroxy derivative, followed by oxidation under conventional Oppenauer conditions.

With the exception of a methyl group, a 6-substituent is next introduced through formation of the enol ether as by the action of ethyl orthoformate and an acid catalyst such as p-toluenesulfonic acid. Fluorination of the intermediate with perchloryl fluoride, followed by acid isomerization, affords the 3-keto-$6\alpha$-fluoro-$\Delta^4$-ene compounds, while treatment of the enol ether intermediate with N-chlorosuccinimide, followed by acid isomerization, affords the $6\alpha$-chloro compounds. Irradiation of the intermediate in iodotrifluoromethane in the presence of pyridine affords the $6\alpha$-trifluoromethyl compounds. A 6-methyl substituent is introduced by first protecting the 20-keto group of a compound of Formula (C) wherein $Z^3$ is a double bond through formation of a ketal, treating the $\Delta^5$-ene with monoperphthalic acid in chloroform to give a $5\alpha,6\alpha$-oxido intermediate and allowing the thus-formed intermediate to react with a methyl Grignard reagent. The thus-formed 3-keto-$5\alpha$-hydroxy-$6\beta$-methyl compound is readily converted to the 3-keto-$6\alpha$-methyl-$\Delta^4$-ene compounds through treatment with sodium hydroxide.

Introduction of the 4,6-diene system may next be accomplished either by the action of chloranil in t-butanol or xylene, or through initial formation of the enol ether as previously described, followed by treatment of this enol ether with 2,3-dichloro-5,6-dicyano-1,4-benzoquinone.

Treatment of a 3-keto-$\Delta^{4,6}$-diene with sodium chlorodifluoroacetate, sodium trichloroacetate, or with dimethylsulfoxonium methylide in the manner previously described yields the corresponding derivative having a difluoromethylene, dichloromethylene, or methylene group, respectively, bridging the $6\alpha,7\alpha$-carbon atoms.

Introduction of the 3-keto-Δ¹,⁴-diene system is effected in a conventional manner, as for example, by the action of 2,3-dichloro-5,6-dicyanobenzoquinone, which conversion of a 3-keto-Δ⁴,⁶-diene to the corresponding 3-keto-1,4,6-triene may be accomplished via the action of chloranil. The 3β-(tetrahydropyran-2-yl) or 3β-acyloxy group is introduced by reduction of 3-keto-Δ⁴-ene with an alkali metal borohydride such as sodium borohydride in an inert solvent such as tetrahydrofuran to afford a 3β-hydroxy group and treatment of the 3β-hydroxy group with dihydropyran and p-toluenesulfonic acid in an inert solvent to yield the corresponding 3β-(tetrahydropyran-2-yloxy) compounds of the present invention. In a similarly conventional manner, treatment of the 3β-hydroxy compound with a molar equivalent of a hydrocarbon carboxylic acid chloride or a hydrocarbon carboxylic acid anhydride in pyridine gives the 3-acyloxy compounds.

The following examples will describe the present invention with specific embodiments and applications; other modifications thereof will be readily apparent to those skilled in the art without departure from the spirit and scope of the invention as defined in the appended claims.

Example 1.—1'-cyclobuteno-(3',4';16α,17α)-pregn-4-ene-3,20-dione; the 1'-methyl and 2'-methyl analog and the 1'-trifluoromethyl and 2'-trifluoromethyl analog A mixture of 2 g. of 3β-acetoxypregna-5,16-dien-20-one in 140 ml. of benzene is irradiated with a 70 watt Hanau high pressure mercury vapor lamp with a Pyrex filter at room temperature while bubbling acetylene through the solution for a period of 3 hours. At the end of the reaction, the mixture is evaporated in vacuo to dryness, chromatographed on silica and the product eluted with ethyl acetate:benzene to yield 1'-cyclobuteno-(3',4';16α,17α)-3β-acetoxypregn-5-en-20-one which is recrystallized from methanol:methylene chloride.

One gram of 1'-cyclobuteno-(3',4';16α,17α)-3β-acetoxypregn-5-en-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1'-cyclobuteno-(3',4';16α,17α)-3β-hydroxypregn-5-en-20-one which is collected by filtration and recrystallized from acetone:hexane.

A solution of 1 g. of the latter compound in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 1'-cyclobuteno-(3',4';16α,17α)-pregn-4-ene-3,20-dione which may be further purified by recrystallization from acetone:hexane.

Utilizing the same starting material and the above procedure, the following substituted acetylenes afforded the following products:

| Substituted Acetylenes | Product |
| --- | --- |
| Propyne-1 | 1'-methyl and 2'-methyl-1'-cyclobuteno-(3',4'; 16α,17α)-pregn-4-ene-3,20-dione. |
| 3,3,3-trifluoropropyne-1 | 1'-trifluoromethyl and 2'-trifluoromethyl-1'-cyclobuteno-(3',4'; 16α,17α)-pregn-4-ene-3,20-dione. |

Example 2.—1',2'-diethyl-1'-cyclobuteno-(3',4';16α,17α)-pregn-4-ene-3,20-dione; other mono and di substituted analogs A mixture of 2 g. of 3β-acetoxypregna-5,16-dien-20-one and 5 g. of hexyne-3 in 140 ml. of benzene is irradiated with a 70 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-diethyl-1'-cyclobuteno-(3',4';16α,17α)-3β-acetoxypregn-5-en-20-one.

One gram of 1',2'-diethyl-1'-cyclobuteno-(3'4';16α,17α)-3β-aceoxypregn-5-en-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1',2'-diethyl-1'-cyclobuteno-(3',4';16α,17α)-3β-hyroxypregn-5-en-20-one which is collected by filtration and recrystallized from acetone:hexane.

A solution of 1 g. of the latter compound in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 1',2'-diethyl-1'-cyclobuteno-(3',4';16α,17α)-pregn-4-ene-3,20-dione which may be further purified by recrystallization from acetone:hexane.

Utilizing the same starting material and the above procedure, the following substituted acetylenes afforded the following products:

| Substituted Acetylenes | Products |
| --- | --- |
| Acetylene dicarboxylic acid | 1',2'-dicarboxy-1'-cyclobuteno-(3',4'; 16α,17α)-pregn-4-ene-3,20-dione. |
| Propiolic acid | 1'-carboxy and 2'-carboxy-1'-cyclobuteno-(3',4'; 16α,17α)-pregn-4-ene-3,20-dione. |
| Ethyl propiolate | 1'-carboxy and 2'-carboxy-1'-cyclobuteno-(3',4'; 16α,17α)-pregn-4-ene-3,20-dione. |
| Diethyl acetylenedicarboxylate | 1',2'-dicarboxy-1'-cyclobuteno- (3',4'; 16α,17α)-pregn-4-ene-3,20-dione. |
| Propargyl bromide | 1'-bromomethyl and 2'-bromomethyl-1'-cyclobuteno-(3',4';16α,17α)-pregn-4-ene-3,20-dione. |
| Dichloro acetylene | 1',2'-dichloro-1'-cyclobuteno-(3',4'; 16α,17α)-pregn-4-ene-3,20-dione. |
| Hexyne-1 | 1'-n-butyl and 2'-n-butyl-1'-cyclobuteno-(3',4'; 16α,17α)-pregn-4-ene-3,20-dione. |
| Tetrolic acid | 1'-methyl-2'-carboxy and 1'-carboxy-2'-methyl-1'-cyclobuteno-(3',4'; 16α,17α)-pregn-4-ene-3,20-dione. |
| Propargyl chloride | 1'-chloromethyl and 2'-chloromethyl-1'-cyclobuteno-(3',4';16α,17α)-pregn-4-ene-3,20-dione. |
| Cyanoacetylene | 1'-cyano and 2'-cyano-1'-cyclobuteno-(3',4'; 16α,17α)-pregn-4-ene-3,20-dione. |
| Dicyanoacetylene | 1',2'-dicyano-1'-cyclobuteno-(3',4'; 16α,17α)-pregn-4-ene-3,20-dione. |

Example 3.—1'-cyclobuteno-(3',4';16α,17α)-19-norpregn-4-ene-3,20-dione and the 1',2'-dimethyl analog A mixture of 2 g. of 3β-acetoxy-19-norpregne-5,16-dien-20-one in 140 ml. of benzene is irradiated with a 70 watt Hanau high pressure mercury vapor lamp with a Pyrex filter at room temperature while bubbling butyne-2 through the solution for a period of 3 hours. At the end of the reaction time, the reaction mixture is evaporated in vacuo to dryness, chromatographed on silica and the product eluted with ethyl acetate and ethyl acetate:benzene to yield 1' - 2' - dimethyl-1'-cyclobuteno-(3',4';16α, 17α) - 3β-acetoxy-19-norpregn-5-en-20-one which is recrystallized from methanol:methylene chloride.

One gram of the latter compound is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1',2' - dimethyl - 1' - cyclobuteno-(3',4';16α,17α) - 3β - hydrovy-19-norpregn-5-ene-20-one which is collected by filtration and recrystallized from acetone:hexane.

A solution of 1 g. of the latter compound in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 1',2' - dimethyl - 1' - cyclobuteno - (3',4';16α,17α)-19-norpregn-4-ene-3,20-dione which may be further purified by recrystallization from acetone:hexane.

In a similar manner, by substituting acetylene in place of butyne-2, there is obtained 1'-cyclobuteno-(3',4';16α,17α)-19-norpregn-4-ene-3,20-dione.

Example 4.—1',2'-dicarboxyl-1'-cyclobuteno-3',4'-16α 17α)-6α-fluoropregn-4-ene-3,20-dione To a suspension of 1 g. of 1',2'-dicarboxy-1'-cyclobuteno-(3',4';16α,17α)-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1',2'-dicarboxy-1'-cyclobuteno - (3',4';16α,17α) - 3-ethoxypregna-3,5-dien-20-one which is recrystallized from acetone:hexane.

A stream of perchloryl fluoride is passed through a solution of 1 g. of the latter compound in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 1',2'-dicarboxy-1'-cyclobuteno-(3',4';16α,17α)-6α-fluoropregn-4-ene-3,20-dione which is recrystallized from acetone:hexane.

Example 5.—6-chloropregna-4,6-diene-3,20-diones

To a suspension of 1 g. of 1',2'-dichloro-1'-cyclobuteno-(3',4';16α,17α)-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1',2'-dichloro - 1' - cyclobuteno - (3',4';16α, 17α)-3-ethoxypregna-3,5-dien - 20 - one which is recrystallized from acetone:hexane.

A mixture of 5 g. of the latter compound, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 1',2'-dichloro-1'-cyclobuteno-(3',4';16α,17α)-6β-chloropregn-4 - ene - 3,20 - dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 1',2'-dichloro-1'-cyclobuteno-(3',4';16α,17α)-6α - chloropregn - 4 - ene-3,20-dione which is recrystallized from acetone:hexane.

One gram of the latter compound and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 1',2'-dichloro-1'-cyclobuteno-(3',4';16α,17α)-6-chloropregna - 4,6 - diene - 3,20 - dione which may be further purified through clarification with alumina and recrystallization from methylene chloride:ether.

In a similar manner, 1'-cyclobuteno-(3',4';16α,17α)-pregn-4-ene-3,20-dione; 1α,2α-methylene-1' - cyclobuteno-(3',4';16α,17α)-pregn-4-ene-3,20-dione; 1' - cyclobuteno-19-norpregn-4-ene-3,20-dione; and 1'-cyclobuteno-(3',4'; 16α,17α)-3β-capryloxypregn-4-ene - 3,20 - dione are converted to the corresponding 6-chloro-Δ⁴,⁶-dienes, namely, 1'-cyclobuteno-(3',4';16α,17α)-6 - chloropregna - 4,6 - diene-3,20-dione;

1α,2α-methylene-1'-cyclobuteno-(3',4';16α,17α)-6 - chloropregna-4,6-diene-3,20-dione;

1'-cyclobuteno-(3',4';16α,17α(-6 - chloro - 19 - norpregna-4,6-diene-3,20-dione; and 1'-cyclobuteno-(3',4';16α,17α)-3β - capryloxy - 6 - chloropregna-4,6-diene-3,20-dione, respectively.

Example 6.—1',2'-dicarboethoxy and 1',2'-dimethyl-1'-cyclobuteno-(3',4';16α,17α)-6α - trifluoromethylpregna-1,4-diene-3,20-dione To a suspension of 1 g. of 1',2'-dicarboethoxy-1'-cyclobuteno-(3',4';16α,17α)-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1',2'-dicarboethoxy-1'-cyclobuteno - (3',4; 16α,17α)-3-ethoxypregna-3,5-dien - 20 - one which is recrystallized from acetone:hexane.

A solution of 1 g. of the latter compound in iodotrifluoromethane containing pyridine is irradiated at room temperature with ultraviolet light from a high pressure mercury lamp. At the end of the reaction time, the reaction mixture is evaporated to dryness. To a solution of the latter material in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 1',2'-dicarboethoxy-1' - cyclobuteno-(3',4';16α,17α)-6α-trifluoromethylpregn-4-ene-3,20-dione.

A mixture of 0.5 g. of the latter compound, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 1',2'-dicarboethoxy - 1' - cyclobuteno - (3',4';16α,17α)-6α-trifluoromethylpregna-1,4-diene-3,20-dione which is further purified by recrystallization from acetone:hexane.

In a similar manner, 1',2'-dimethyl-1'-cyclobuteno-(3',4';16α,17α)-pregn-4-ene-3,20-dione is converted first to the 1',2' - dimethyl - 1'-cyclobuteno-(3',4-;16α,17α)-6α-trifluoromethylpregn-4-ene-3,20-dione and finally to the 1',2' - dimethyl - 1'-cyclobuteno-(3',4';16α,17α)-6α-trifluoromethylpregna-1,4-diene-3,20-dione.

Example 7.—1' - cyclobuteno - (3',4';16α,17α)-6α-methylpregn-4-ene-3,20-dione, 1',2'-dimethyl compounds and the 19-nor analogs A mixture of 2 g. of 3β-acetoxy-6-methylpregna-5,16-dien-20-one (Tetrahedron Letters, 489, 1962) in 140 ml. of benzene is irradiated with a 70 watt Hanau high pressure mercury vapor lamp with a Pyrex filter at room temperature while bubbling butyne-2 through the solution for a period of 3 hours. At the end of the reaction, the mixture is evaporated in vacuo to dryness, chromatographed on silica and the product eluted with ethyl acetate:benzene to yield 1',2' - dimethyl-1'-cyclobuteno-(3',4';16α,17α)-3β-acetoxy-6-methylpregn-5-en - 20 - one which is recrystallized from methanol:methylene chloride.

One gram of the latter compound is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1',2-dimethyl - 1' - cyclobuteno-(3',4';16α,17α)-3β-hydroxy-6-methylpregn-5-en-20-one which is collected by filtration and recrystallized from acetone:hexane.

A solution of 1 g. of the latter compound in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 1',2' - dimethyl - 1'-cyclobuteno-(3',4-;16α,17α)-6α-methylpregn-4-ene-3,20-dione which may be further purified by recrystallization from acetone:hexane.

Utilizing the above procedure, 3β - acetoxy - 19-norpregna-5,16-dien-20-one is converted to 1',2'-dimethyl-1'-cyclobuteno - (3',4';16α,17α) - 6α-methyl-19-norpregn-4-ene-3,20-dione.

In a similar manner, using the same two starting materials and substituting acetylene or butyne-2 in the irradiation step, there are obtained 1'-cyclobuteno-(3',4';16α,17α) - 6α - methylpregn - 4-ene-3,20-dione and 1'-cyclobutena-(3',4';16α,17α) - 6α - methyl-19-norpregn-4-ene-3,20-dione.

Example 8.—1'-trifluoromethyl and 2'-trifluoromethyl-1'-cyclobuteno-(3',4';16α,17α)-1α,2α - difluoromethylenepregn-4-ene-3,20-dione A mixture of 2.0 g. of 3β-acetoxy-5α-pregn-16-en-20-one in 140 ml. of benzene is irradiated with a 70 watt Hanau high pressure mercury vapor lamp with a Pyrex filter at room temperature while bubbling 3,3,3-trifluoropropyne-1 through the solution for a period of 3 hours. At the end of the reaction time, the reaction mixture is evaporated to dryness, chromatographed on silica and the product eluted with ethyl acetate:benzene to yield 1'-trifluoromethyl and 2'-trifluoromethyl-1'-cyclobuteno-(3',4';16α,17α)-3β-acetoxy-5α-pregnan-20-one which are recrystallized from methanol methylene chloride.

One gram of 2'-trifluoromethyl-1'-cyclobuteno-(3',4'; 16α,17α)-3β-acetoxy-5α-pregnan-20 - one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 2' - trifluoromethyl-1'-cyclobuteno-(3',4';16α,17α)-3β-hydroxy - 5α-pregnan-20-one which is collected by filtration and recrystallized from acetone:hexane.

To a stirred solution of 1 g. of the latter compound in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 2'-trifluoromethyl - 1' - cyclobuteno - (3',4';16α,17α)-5α-pregnan-3,20-dione which may be further purified by recrystallization from acetone:hexane.

A solution of 2.5 g. of the latter compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 2' - trifluoromethyl - 1',2' - oxidocyclobutano - 3',4';16α, 17α)-5α-pregnane-3,20-dione which may be further purified by recrystallization from acetone:hexane.

To a stirred solution of 1 g. of the latter material and 6.6 g. of p-toluenesulfonic acid in 300 ml. of glacial acetic acid is added, over a 10 minute period, a solution of 1.1 molar equivalents of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well-stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. The residue is chromatographed on acid washed alumina with 3:1 benzene:chloroform to yield 1',2'-oxido-2'-trifluoromethylcyclobutano-(3',4';16α,17α) - 5α - pregn-1-en-3,20-dione which may be recrystallized from cyclohexane:ethyl acetate.

A solution of 45 equivalents of sodium chlorodifluoroacetate in 50 ml. of triethylene glycol dimethyl ether is added in a dropwise fashion to a refluxing solution of the latter compound in 10 ml. of triethylene glycol dimethyl ether. Refluxing is discontinued upon the absence of any change in the U.V. spectrum and the mixture is then filtered and evaporated to dryness under reduced pressure. The residue is then heated at reflux for one hour with a 1% methanolic solution of potassium hydroxide. At the end of this time, the reaction mixture is neutralized with dilute hydrochloric acid and evaporated to dryness. The residue is then chromatographed on alumina with methylene chloride to yield 1α,2α-difluoromethylene-1',2' - oxido - 2' - trifluoromethylcyclobutano - (3',4';16α, 17α)-5α-pregnane-3,20-dione.

To a stirred solution of 1 g. of the latter compound and 6.6 g. of p-toluenesulfonic acid in 330 ml. of glacial acetic acid is added over a 10 minute period, a solution of 1.1 molar equivalents of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well-stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α-difluoromethylene-1',2'-trifluoromethyl - 1' - cyclobutano - (3',4';16α,17α)-pregn-4-ene-3,20-dione.

A mixture of 1 g. of the latter compound, 1.5 g. of sodium iodide, 400 mg. of sodium acetate, and 280 mg. of zinc dust, in 20 ml. of acetic acid containing 0.25 ml. of water, is stirred at room temperature for 6 hours. The reaction mixture is filtered and the filtrate is diluted with water and extracted with ethyl acetate. The extracts are washed, dried and evaporated to dryness to yield 1α,2α-difluoromethylene - 2' - trifluoromethyl - 1' - cyclobuteno-(3',4';16α,17α)-pregn-4-ene-3,20-dione which is recrystallized from benzene-acetone.

Example 9.—1'-cyclobuteno-(3',4';16α,17α)-6α,7α-difluoromethylenepregn-4-ene-3,20-dione and the 19-nor analog To a solution of 1 g. of 1'-cyclobuteno-(3',4';16α,17α)-3β-acetoxypregn-5-en-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 1'-cyclobuteno-(3',4';16α,17α)-pregna-4,6-diene-3,20-dione which may be further purified through recrystallization from acetone:hexane.

To a stirred and refluxing solution of 1 g. of the latter compound in 8 ml. of diethyleneglycol dimethyl ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1-cyclobuteno - (3',4';16α,17α) - 6α,7α - difluoromethylenepregn-4-ene-3,20-dione.

Utilizing the above procedure, 1'-cyclobuteno-(3',4'; 16α,17α)-3β-acetoxy-19-norpreg-5-ene-20-one is converted to 1'-cyclobuteno-(3',4';16α,17α)-6α,7α-difluoromethylene-19-norpregn-4-ene-3,20-dione.

Example 10.—3β-hydroxy and 3β-tetrahydropyran-2-yl ether

A solution of 200 mg. of 1',2'-dichloro-1'-cyclo-buteno-(3',4';16α,17α)-6-chloropregna-4,6-diene-3,20-dione in 32 ml. of anhydrous isopropanol and 25 mg. of sodium borohydride is stirred at room temperature for 15 hours. One hundred ml. of water is added and the resulting suspension extracted several times with ether. The ether phase is dried over sodium sulfate and evaporated to dryness under reduced pressure to yield 1',2'-dichloro-1'-cyclobuteno-(3',4';16α,17α)-3β-hydroxy-6-chloropregna-4,6-dien - 20-one which may be further purified by recrystallization from ether.

To a solution of 1 g. of the latter compound in 20 ml. of benzene, 20 ml. of dihydropyran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 1',2'-dichloro-1'-cyclobuteno-(3',4';16α,17α)-3β-(tetrahydropyran-2''-yloxy)-6-chloropregna-4,6 - dien-20-one.

Example 11.—Δ$^{4,6}$-dienes

One gram of 1'-cyclobuteno-(3',4';16α,17α)-6α-methylpregn-4-ene-3,20-dione and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 1'-cyclobuteno-(3',4';16α,17α)-6-methylpregna-4,6-diene-3,20-dione which may be further purified through clarification with alumina and recrystallization from methylene chloride:ether.

Utilizing the same procedure, 1'-cyclobuteno-(3',4';16α, 17α)-19-norpregn-4-ene-3,20-dione is converted to 1'-cyclobuteno-(3',4';16α,17α)-19-norpregna-4,6 - diene - 3, 20-dione.

Example 12.—Δ$^{1,4,6}$-trienes

A mixture of 1 g. of 1'-cyclobuteno-(3',4';16α,17α)-6-chloropregna-4,6-diene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 1'-cyclobuteno-(3',4';16α,17α)-6-chloropregna-1,4,6-triene-3,20-dione which may be further purified through recrystallization from acetone:hexane.

Utilizing the same procedure, other 6-chloropregna-4,6-diene-3,20-diones of Example 5 are converted to the corresponding 6-chloropregna-1,4,6-triene-3,20-dione. Notably is the 1',2'-dichloro-1'-cyclobuteno-(3',4';16α,17α)-6-chloropregna-1,4,6-triene-3,20-dione.

Example 13

A solution of 1 g. of 1',2'-dicarboxy-1'-cyclobuteno-(3',4';16α,17α)-pregn-4-ene-3,20-dione in 50 ml. of ethyl acetate is treated at 0° C. with a solution containing 0.1 g. of diazomethane in 10 ml. of anhydrous ether. The reaction mixture is heated on a steam bath for 5 minutes and concentrated to a small volume to afford 1',2'-dicarbomethoxy-1'-cyclobuteno-(3',4';16α,17α)-pregn-4-ene - 3, 20-dione.

In a similar manner, 1'-methyl-2'-carboxy and 1'-carboxy-2'-methyl-1'-cyclobuteno-(3',4';16α,17α)-pregn - 4-ene-3,20-diones are converted to 1'-methyl-2'-carbomethoxy and 1'-carbomethoxy-2'-methyl-1'-cyclobuteno-(3'4';16α,17α)-pregn-4-ene-3,20-diones.

Example 14.—3β-hydroxy and 3β-esters

A solution of 200 mg. of 1'-cyclobuteno-(3',4';16α, 17α)-6-chloropregna-4,6-diene-3,20-dione in 32 ml. of anhydrous isopropanol and 25 mg. of sodium borohydride is stirred at room temperature for 15 hours. One-hundred ml. of water is added and the resulting suspension extracted several times with ether. The ether phase is dried over sodium sulfate and evaporated to dryness under reduced pressure to yield 1'-cyclobuteno-(3',4';16α,17α)-3β-hydroxy-6-chloropregna-4,6-dien-20-one which may be further purified by recrystallization from ether.

A mixture of 1 g. of the latter compound, 4 ml. of pyridine and 2 ml. of acetic anhydride is allowed to stand at room temperature for 15 hours. The mixture is then poured into ice water and the solid which forms is collected by filtration, washed with water and dried to yield 1'-cyclobuteno-(3',4';16α,17α)-3β-acetoxy - 6 - chloropregna-4,6-dien-20-one.

In a similar manner, the above 3β-hydroxy compound is treated with caproic anhydride to yield the corresponding 3β-caproyloxy-6-chloropregna-4,6-dien-20-one.

Example 15.—6α-fluoro-Δ⁴-ene, Δ⁴,⁶-diene and Δ¹,⁴,⁶-triene

To a suspension of 1 g. of 1'-cyclobuteno-(3',4';16α,17α)-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1'-cyclobuteno-(3',4';16α,17α)-3-ethoxypregna-3,5-dien - 20-one which is recrystallized from acetone:hexane.

A stream of perchloryl fluoride is passed through a solution of 1 g. of the latter compound in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 1' - cyclobuteno - (3',4';16α,17α)-6α-fluoropregn-4-ene-3,20-dione which is recrystallized from acetone:hexane.

One gram of the latter compound and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 1' - cyclobuteno-(3',4';16α,17α)-6 - fluoropregna - 4,6 - diene - 3,20 - dione which may be further purified through clarification with alumina and recrystallization from methylene chloride:ether.

A mixture of 1 g. of the latter compound, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 1' - cyclobuteno - (3',4';16α,17α)-6 - fluoropregna - 1,4,6 - triene - 3,20 - dione which may be further purified through recrystallization from acetone:hexane.

What is claimed is:

1. A compound according to the formula:

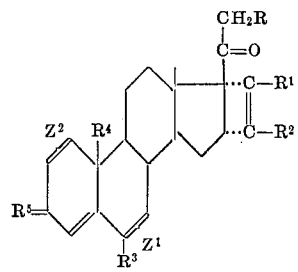

wherein $Z^1$ is a carbon-carbon single bond, a carbon-carbon double bond or the group

bridging the C–6 and C–7 carbon atoms, X being hydrogen, chloro or fluoro;

$Z^2$ is a carbon-carbon single bond, a carbon-carbon double bond or the group $$\diagdown\!\!\!\!C X'_2\diagup$$

bridging the C–1 and C–2 carbon atoms, X' being hydrogen, chloro or fluoro;

R is hydrogen, chloro or fluoro;

each of $R^1$ and $R^2$ is hydrogen, carboxy, carboalkoxy, halo, lower alkyl, cyano or halomethyl;

$R^3$ is hydrogen, chloro, fluoro, methyl or trifluoromethyl, $R^3$ being in the β-configuration when $Z^1$ is the group

and $R^3$ being in either the α or β-configuration when $Z^1$ is a carbon-carbon single bond;

$R^4$ is hydrogen or methyl, $R^4$ being methyl when $Z^2$ is a carbon-carbon double bond; and $R^5$ is keto or the group $$R^6O-\overset{H}{\underset{\cdot}{\phantom{C}}}$$

wherein $R^6$ is hydrogen, tetrahydropyran-2-yl, tetrahydrofuran-2-yl or a hydrocarbon carboxylic acyl group containing less than 12 carbon atoms.

2. A compound according to claim 1 wherein $Z^1$ is a carbon-carbon single bond; $Z^2$ is a carbon-carbon single bond; each of R, $R^1$, $R^2$ and $R^3$ is hydrogen; $R^4$ is methyl; and $R^5$ is keto.

3. A compound according to claim 1 wherein $Z^1$ is a carbon-carbon double bond; $Z^2$ is a carbon-carbon single bond; each of R, $R^1$ and $R^2$ is hydrogen; $R^3$ is chloro; $R^4$ is methyl; and $R^5$ is keto.

4. A compound according to claim 1 wherein each of $Z^1$ and $Z^2$ is a carbon-carbon double bond; each of R, $R^1$ and $R^2$ is hydrogen; $R^3$ is chloro; $R^4$ is methyl; and $R^5$ is keto.

5. A compound according to claim 1 wherein $Z^1$ is a carbon-carbon double bond; $Z^2$ is the group $$\diagdown\!\!\!\!C X'_2\diagup$$

X' being hydrogen; each of R, $R^1$ and $R^2$ is hydrogen; $R^3$ is chloro; $R^4$ is methyl; and $R^5$ is keto.

6. A compound according to claim 1 wherein $Z^1$ is a carbon-carbon double bond; $Z^2$ is a carbon-carbon single bond; each of R, $R^1$, $R^2$ and $R^4$ is hydrogen; $R^3$ is chloro; and $R^5$ is keto.

7. A compound according to claim 1 wherein each of $Z^1$ and $Z^2$ is a carbon-carbon single bond; R is hydrogen; each of $R^1$, $R^2$ and $R^4$ is methyl; $R^3$ is α-trifluoromethyl; $R^5$ is keto.

8. A compound according to claim 1 wherein each of $Z^1$ and $Z^2$ is a carbon-carbon single bond; each of R, $R^1$ and $R^2$ is hydrogen; $R^3$ is α-methyl; $R^4$ is methyl; and $R^5$ is keto.

9. A compound according to claim 1 wherein $Z^1$ is a carbon-carbon double bond; $Z^2$ is a carbon-carbon single bond; each of R, $R^1$ and $R^2$ is hydrogen; $R^3$ is chloro; $R^4$ is methyl; $R^5$ is the group

in which $R^6$ is caproyl.

10. A compound according to claim 1 wherein $Z^1$ is a carbon-carbon double bond; $Z^2$ is a carbon-carbon single bond; each of R, $R^1$, $R^2$, $R^3$ and $R^4$ is hydrogen; $R^5$ is keto.

11. A compound according to claim 1 wherein each of $Z^1$ and $Z^2$ is a carbon-carbon single bond; each of R and $R^3$ is hydrogen; each of $R^1$ and $R^2$ is carbomethoxy; $R^4$ is methyl; $R^5$ is keto.

12. A compound according to claim 1 wherein each of $Z^1$ and $Z^2$ is a carbon-carbon single bond; each of R and $R^3$ is hydrogen; each of $R^1$ and $R^2$ is chloro; $R^4$ is methyl; and $R^5$ is keto.

13. A compound according to claim 1 wherein each of $Z^1$ and $Z^2$ is a carbon-carbon single bond; each of R, $R^1$ and $R^3$ is hydrogen; $R^2$ is trifluoromethyl; $R^4$ is methyl; and $R^5$ is keto.

14. A compound according to claim 1 wherein $Z^1$ is a carbon-carbon double bond; $Z^2$ is a carbon-carbon single bond; each of R, $R^1$ and $R^2$ is hydrogen; $R^3$ is chloro; $R^4$ is methyl; and $R^5$ is the group

wherein $R^6$ is hydrogen.

15. A compound according to claim 1 wherein $Z^1$ is a carbon-carbon double bond; $Z^2$ is a carbon-carbon single bond; each of R, $R^1$ and $R^2$ is hydrogen; $R^3$ is chloro; $R^4$ is methyl; and $R^5$ is the group

wherein $R^6$ is acetyl.

16. A compound according to claim 1 wherein each of $Z^1$ and $Z^2$ is a carbon-carbon single bond; each of R, $R^1$ and $R^2$ is hydrogen; $R^3$ is α-fluoro; $R^4$ is methyl; and $R^5$ is keto.

17. A compound according to claim 1 wherein $Z^1$ is a carbon-carbon double bond; $Z^2$ is a carbon-carbon single bond; each of R, $R^1$ and $R^2$ is hydrogen; $R^3$ is fluoro; $R^4$ is methyl; and $R^5$ is keto.

18. A compound according to claim 1 wherein each of $Z^1$ and $Z^2$ is a carbon-carbon single bond; each of R, $R^1$ and $R^2$ is hydrogen; $R^3$ is chloro; $R^4$ is methyl; and $R^5$ is keto.

19. A compound according to claim 1 wherein each of $Z^1$ and $Z^2$ is a carbon-carbon double bond; each of R, $R^1$ and $R^2$ is hydrogen; $R^3$ is fluoro; $R^4$ is methyl; and $R^5$ is keto.

References Cited

Sunder-Plassman et al.; Tetrahedron Letters, No. 29, pp. 3451–3456 (1966).

Sunder-Plassman et al.; Tetrahedron Letters, No. 7, pp. 653–657 (1967).

LEWIS GOTTS, *Primary Examiner.*

E. G. LOVE, *Assistant Examiner.*